(12) United States Patent
Brooks et al.

(10) Patent No.: US 9,141,168 B2
(45) Date of Patent: Sep. 22, 2015

(54) OPERATION MODE OF PROCESSOR

(75) Inventors: Robert C Brooks, Houston, TX (US); Timothy J Freese, Niwot, CO (US)

(73) Assignee: Hewlett-Packard Development Company L.P., Houston, TX (US)

( * ) Notice: Subject to any disclaimer, the term of this patent is extended or adjusted under 35 U.S.C. 154(b) by 145 days.

(21) Appl. No.: 13/589,065

(22) Filed: Aug. 17, 2012

(65) Prior Publication Data

US 2014/0052869 A1 Feb. 20, 2014

(51) Int. Cl.
*G06F 1/32* (2006.01)
*H04L 29/06* (2006.01)

(52) U.S. Cl.
CPC .............. *G06F 1/3209* (2013.01); *G06F 1/324* (2013.01); *G06F 1/3287* (2013.01); *H04L 69/12* (2013.01); *Y02B 60/1217* (2013.01); *Y02B 60/1282* (2013.01)

(58) Field of Classification Search
CPC ..... G06F 1/3209; G06F 1/324; G06F 1/3287; G06F 15/16; Y02B 60/1282; Y02B 60/1217; H04L 69/12
See application file for complete search history.

(56) References Cited

U.S. PATENT DOCUMENTS

| 7,330,988 | B2 | 2/2008 | Golla et al. |
| 7,380,038 | B2 | 5/2008 | Gray |
| 8,073,498 | B2 | 12/2011 | Reinisch et al. |
| 2005/0138159 | A1* | 6/2005 | Challener et al. ............. 709/223 |
| 2010/0115308 | A1* | 5/2010 | Iino et al. ...................... 713/320 |
| 2010/0191992 | A1* | 7/2010 | Shen et al. |
| 2011/0126033 | A1* | 5/2011 | Springfield et al. .......... 713/320 |

OTHER PUBLICATIONS

"TI and Clientron Team Up to Develop the DM8148 Applications Processor-based Thin Client Reference Design," Jun. 7, 2012, pp. 1-3, Press Release, DigiTimes, Inc.
Jiri Kouril, "Performance Analysis of Distribution Protocols Used by Thin Clients," Sep. 2011, pp. 28-33, vol. 2, No. 3, elektrorevue.
M. Al-Turkistany and A. Helal, "Intelligent Adaptation Framework for Wireless Thin-client Environments," Aug. 2004, pp. 1-12, University of Florida.

* cited by examiner

*Primary Examiner* — Ebrahim Golabbakhsh
(74) *Attorney, Agent, or Firm* — Hewlett-Packard Patent Department

(57) ABSTRACT

A computing device to detect a communication protocol between the computing device and a second computing device, to identify operating parameters associated with the communication protocol, and to modify a mode of operation of a processor based on the operating parameter.

17 Claims, 5 Drawing Sheets

OPERATION MODE OF PROCESSOR

BACKGROUND

When changing a mode of operation of a processor, a user can utilize a keyboard or mouse to access a Basic Input/Output System (BIOS) of a computing device. In one example, the user can overclock the processor by modifying an operating speed of the processor through a setting of the BIOS. In another example, the user can modify an amount of power supplied to the processor through a setting of the BIOS.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

A network interface component of a computing device couples to a second computing device with a communication protocol. For the purposes of this application, a communication protocol is a set of rules and procedures that specify how the computing device communicates with the second computing device. The computing device identifies operating parameters for the computing device associated with the communication protocol. The operating parameters specify which features of the computing device are to be used by the communication protocol. In one embodiment, identifying the operating parameters includes identifying which cores of a processor of the computing device are used by the communication protocol.

The processor is an integrated circuit, such as central processing unit, which can include one or more cores. A core of the processor can also be a central processing unit. In response to identifying the operating parameters, the computing device can proceed to modify a mode of operation of a processor of the computing device. In one example, modifying the mode of operation includes the computing device enabling a core used by the communication protocol or the computing device disabling a core not used by the communication protocol. In another embodiment, the computing device can increase an operating speed of a core used by the communication protocol or the computing device can decrease an operating speed of a core not used by the communication protocol. By modifying the mode of operation of the processor results, an amount of power used by the processor and the computing device can be managed based on the communication protocol.

Figure 1:
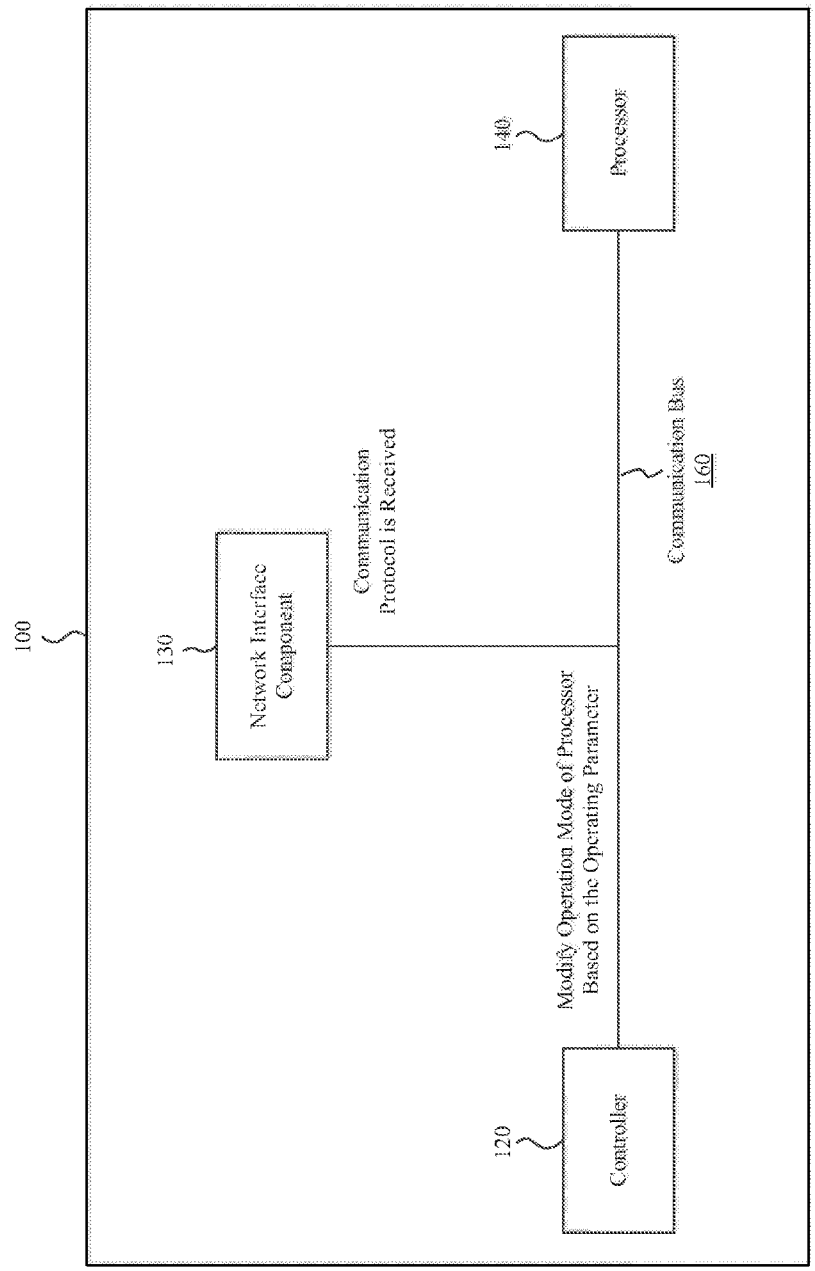
FIG. 1 illustrates a computing device to modify a mode of operation of a processor according to an example.

FIG. 1 illustrates a computing device 100 to modify a mode of operation of a processor 140 according to an example. The computing device 100 can be an all-in-one system, a notebook, a netbook, a tablet, a desktop, a workstation, and/or a server. In another embodiment, the computing device 100 can be a thin client, a cellular device, a smart phone, a PDA (Personal Digital Assistant), and E (Electronic)-Reader, and/or any additional computing device 100 which couples to a second computing device.

The computing device 100 includes a controller 120, a network interface component 130, a processor 140, and a communication bus 160 for the computing device 100 and/or one or more components of the computing device 100 to communicate with one another. In one example, the computing device 100 also includes a protocol application stored on a non-volatile computer readable medium included in or accessible to the computing device 100. For the purpose of this application, the protocol application is an application or a firmware of the computing device 100 which can be utilized independently and/or in conjunction with the controller 120 to manage the computing device 100.

The network interface component 130 couples the computing device 100 to a second computing device using a communication protocol. The network interface component 130 is a hardware communication device of the computing device 100, such as a network interface card or network adaptor, which can couple to the second computing device using the communication protocol. For the purposes of this application, a communication protocol is a set of rules and procedures which specify how the computing device 100 communicates with the second computing device.

The communication protocol used between the computing device 100 and the second computing device can be specified by the second computing device or the communication protocol can be specified by the controller 120 and/or the protocol application of the computing device 100. Similar to the computing device 100, the second computing device can be an all-in-one system, a notebook, a netbook, a tablet, a desktop, a workstation, a server, a thin client, a cellular device, a smart phone, a PDA, and/or an E-Reader.

The controller 120 and/or the protocol application can identify the communication protocol being used between the computing device 100 and the second computing device. When identifying the communication protocol, the controller 120 and/or the protocol application can access a data packet of the communication protocol. The data packet includes bit strings with a header which identifies the communication protocol. In another embodiment, the second computing device transmits to the computing device 100 a file and/or a packet which identifies the communication protocol.

In response to identifying the communication protocol, the controller 120 and/or the protocol application proceed to identify operating parameters associated with the communication protocol. For the purposes of this application, the operating parameters specify which features of the computing device 100 the communication protocol uses. In one embodiment, the operating parameters can specify which components of the computing device 100 are used by the communication protocol. For example, the operating parameters can specify which cores of a processor 140 coupled to the computing device 100 are used by the communication protocol.

When identifying the operating parameters, the controller 120 and/or the protocol application can access a list or lookup table of the computing device 100. The lookup table can include one or more entries which list a communication protocol with corresponding operating parameters. In response to identifying the operating parameters, the controller 120 and/or the protocol application proceed to modify a mode of operation of the processor 140. The processor 140 is an integrated circuit with one or more cores. A core of the processor 140 can be a central processing unit, such as a general purpose core, a graphics core, a display core, a digital signal core, and/or a multimedia core.

In response to identifying the operating parameters associated with the communication protocol, the controller 120 and/or the protocol application proceed to modify a mode of operation of a processor 140 with the operating parameters. When modifying the mode of operation of the processor 140, the controller 120 and/or the protocol application can enable and/or disable one or more cores of the processor 140. In another embodiment, the controller 120 and/or the protocol application can increase and/or decrease an operating speed of one or more cores of the processor 140. Enabling and/or increasing an operating speed of a core can result in the corresponding core and/or the processor 140 using more power. Disabling and/or decreasing an operating speed of a core can result in the corresponding core and/or the processor 140 using less power. As a result, modifying a mode of operation of the processor 140 can result in increasing and/or decreasing an amount of power supplied to a core and/or to the processor 140.

Figure 2:
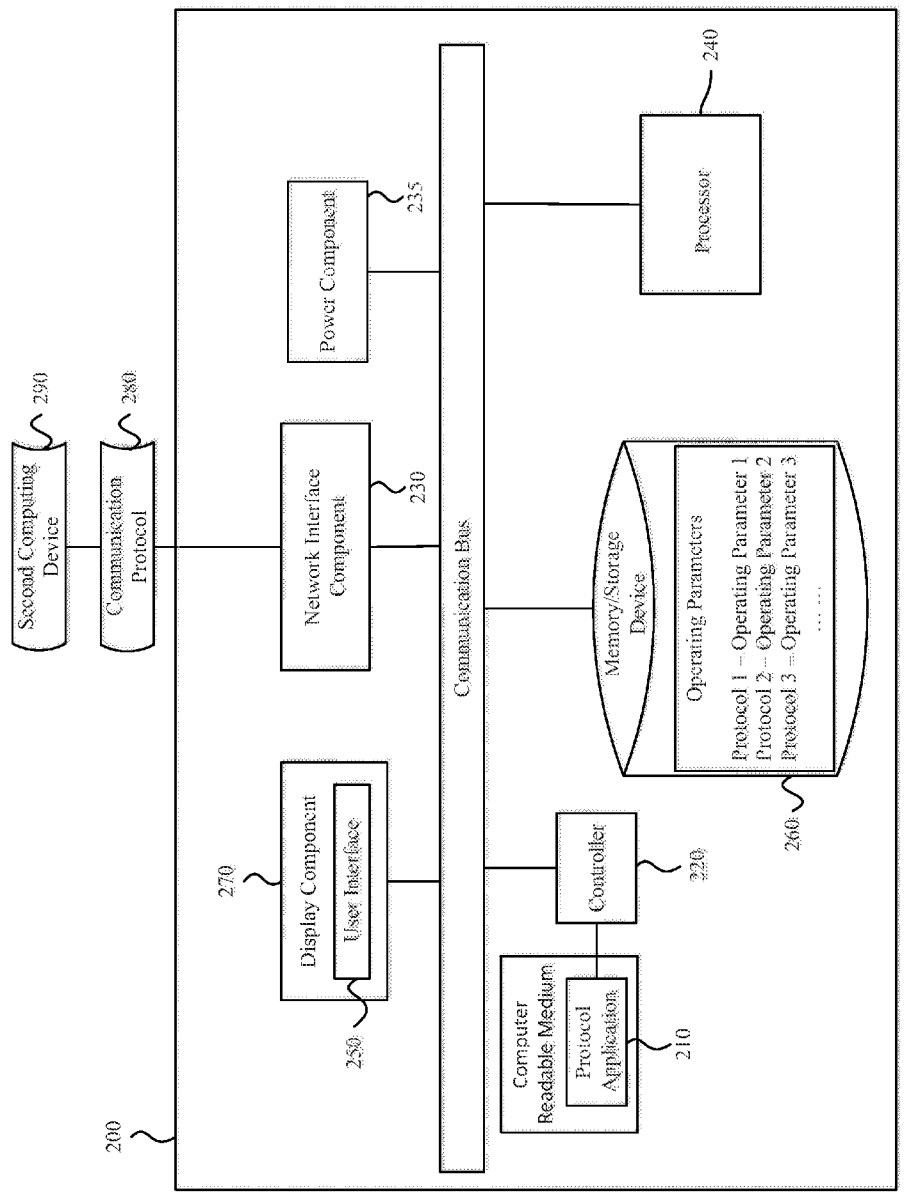
FIG. 2 illustrates a computing device to identify operating parameters based on a communication protocol used between the computing device and a second computing device according to an example.

FIG. 2 illustrates a computing device 200 to identify operating parameters based on a communication protocol 280 used between the computing device 200 and a second computing device 290 according to an example. The network interface component 230 is a hardware communication device, such as a network interface card or network adaptor, which couples the computing device 200 to the second computing device 290 with a communication protocol 280. In one embodiment, the network interface component 230 also receives power from the second component or a power source coupled to the network interface component 230. The received power is supplied to a power component 235, such as a power supply, of the computing device 200.

As noted above, a communication protocol 280 is a set of rules and procedures which specify how the computing device 200 communicates with the second computing device. The communication protocol 280 can specify how information, data, and/or messages are communicated between the computing device 200 and the second computing device 290. For example, a communication protocol 280 can be a high definition (HDX) protocol, a remote desktop (RDP) protocol, a remote FX protocol, and/or a PC over IP (PCoIP) protocol which is utilized for a user session of the computing device 200. In one embodiment, the communication protocol 280 is specified and transmitted through the network interface component 230 by the second computing device 290. In another embodiment, the communication protocol 280 is specified by the controller 220 and/or the protocol application 210 of the computing device 200.

The protocol application 210 includes executable instructions which can be utilized independently and/or in conjunction with the controller 220 to manage the computing device 200. In one embodiment, the protocol application 210 can be a basic input/output system (BIOS) of the computing device 200. In another embodiment, the protocol application 210 can be firmware embedded onto one or more components of the computing device 200. In other embodiments, the protocol application 210 can be an application accessible from a non-volatile computer readable memory of the computing device 200. The computer readable memory is a tangible apparatus that contains, stores, communicates, or transports the application for use by or in connection with the computing device 200. The computer readable memory can be a hard drive, a compact disc, a flash disk, a network drive or any other tangible apparatus coupled to the computing device 200.

If the communication protocol 280 is received from second computing device 290, the controller 220 and/or the protocol application 210 attempts to identify the communication protocol 280. When identifying the communication protocol 280, the controller 220 and/or the protocol application 210 poll the second computing device 290 for a file, a packet, and/or a message which identifies the communication protocol 280. In another embodiment, the controller 220 and/or the protocol application 210 identify the communication protocol 280 based on a pattern of the information, data, and/or messages received from the second computing device 290. In other embodiments, a user of the computing device 200 can select a communication protocol 280 to be used between the computing device 200 and the second computing device 290 by accessing a user interface 250 rendered on a display component 270 of the computing device 200. The user interface 250 can render a list of one or more available communication protocols 280 which can be used.

In response to identifying the communication protocol 290, the controller 220 and/or the protocol application 210 identify operating parameters 260 associated with the communication protocol 290. An operating parameter 260 specifies which features of the computing device 200 the corresponding communication protocol 280 uses. In one embodiment, the operating parameter 260 specifies which components of the computing device 200 are used by the communication protocol 280. For example, the operating parameters can specify which cores of a processor 240 are used for the communication protocol 280. In other embodiments, the operating parameter can specify which additional components of the computing device 200 are to be used and which additional components are not to be used by the communication protocol 280.

When identifying an operating parameter 260, the controller 220 and/or the protocol application 210 access a list of operating parameters. The list can be a lookup table, and/or database of operating parameters 260 stored locally on a storage device or remotely at a location accessible to the computing device 200. The controller 220 and/or the protocol application 210 detect entries of the list for the communication protocol 280 used between the computing device 200 and the second computing device 290. If a matching entry is found, the controller 220 and/or the protocol application 210 identify the corresponding operating parameter 260 included from the matching entry to be the operating parameter 260 associated with the communication protocol 280.

In another embodiment, the controller 220 and/or the protocol application 210 access a history log of the computing device 200 to determine if the communication protocol 280 was previously used between the computing device 200 and the second computing device 290. If the communication protocol 280 was previously used, the controller 220 and/or the protocol application 210 can use the history log to identify which components of the computing device 200 were previously used by the communication protocol 280. In one embodiment, the controller 220 and/or the protocol application 210 identifies which cores of the processor 240 were previously used by the communication protocol 280. The controller 220 and/or the protocol application 210 proceed to modify a mode of operation of a processor 240 based on the operating parameter 260, which can result in improved performance and reducing wasted power.

Figure 3:
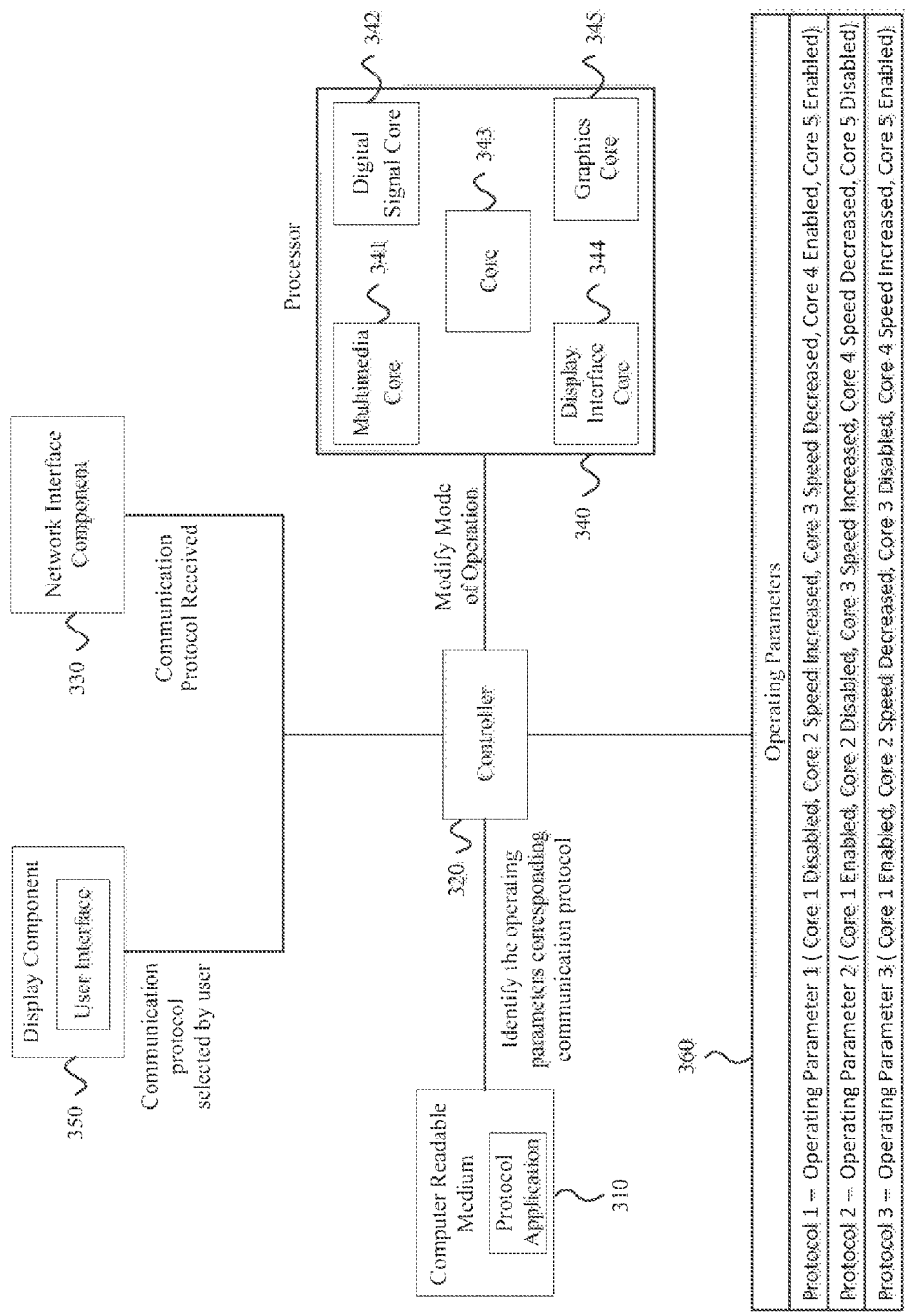
FIG. 3 illustrates a block diagram of a controller to modify a mode of operation of a processor according to an example.

FIG. 3 illustrates a block diagram of a controller 320 to modify a mode of operation of a processor 340 according to an example. In one embodiment, the communication protocol is selected by a user accessing a user interface 350. In another embodiment, the communication protocol is received from the second computing device through the network interface component 330. In response to identifying the communication protocol, operating parameters associated with the communication protocol are identified. As shown in FIG. 3, the controller 320 and/or protocol application 310 can identify the operating parameter 360 associated with the communication protocol by accessing the list of operating parameters 360. Each entry of the list of operating parameters is detected for the identified communication protocol. If a matching entry is found, the controller 320 and/or the protocol application 310 determine that the corresponding operating parameter 360 is to be used to for modifying a mode of operation of the processor 340.

As noted above, the processor 340 in an integrated circuit which includes multiple cores. The cores of the processor 340 are central processing units, such as a multimedia core 341, a digital signal core 342, a display interface core 344, a graphics core 345, and a general purpose core 343. In other embodiments, the processor 340 can include other cores in addition to and/or in lieu of those noted above and illustrated in FIG. 3. In one embodiment, when modifying the mode of operation of the processor 340, the controller 320 and/or the protocol application 310 enable at least one core and/or disable at least one core of the processor 340 based on the operating parameter 360. In another embodiment, the controller 320 and/or the protocol application 310 increase an operating speed of at least one core and/or decrease an operating speed of at least one core of the processor 340 based on the operating parameter 360.

Enabling or disabling at least one core of the processor 340 can occur simultaneously with modifying an operating speed of at least core of the processor 340. In other embodiments, the controller 320 and/or the protocol application 310 can further modify how the caches of the processor 340 are used by the cores of the processor 340. For example, the controller 320 and/or the protocol application 310 can give priority access to a cache or a level of the cache to an enabled core and/or an increased operating speed core of the processor 340. In another example, the controller 320 and/or the protocol application 310 can reduce the priority or restrict access to a cache or a level of cache to a disabled core and/or a reduced operating speed core.

As shown in the present example, the controller 320 and/or the protocol application 310 can determine to modify the mode of operation of processor 340 with Operating Parameter 1; specifying to disable core 1, enable core 2 and increase the operating speed of core 2, enable core 3 and decrease the operating speed of core 3, enable core 4, and enable core 5. The controller 320 and/or the protocol application 310 proceed to disable the multimedia core 341, enable and increase the operating speed of digital signal core 342, enable and decrease the operating speed of the general purpose core 343, enable the display interface core 344, and enable the graphics core 345. By modifying at least one core of the processor 340, an amount of power used to the processor 340 can be modified. For example, by enabling or increasing an operating speed of a core, the processor 340 can utilize more power. In another example, by disabling or by decreasing an operating speed of a core, the processor 340 can use less power.

Figure 4:
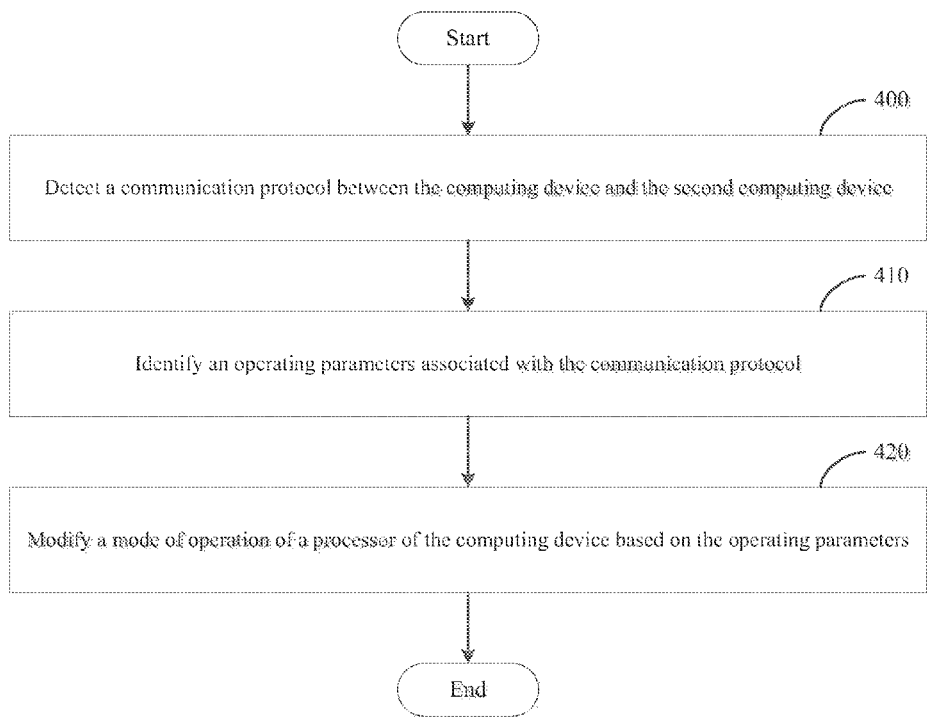
FIG. 4 is a flow chart illustrating a method to managing a computing device according to an example.

FIG. 4 is a flow chart illustrating a method to managing a computing device according to an example. A network interface component of the computing device couples the computing device to a second computing device. If the network interface component is coupled to the second computing device, the controller and/or the protocol application detect the communication protocol used between the computing device and the second computing device at 400. In response to detecting the communication protocol, the controller and/or the protocol application identify the communication protocol and identify operating parameters associated with the communication protocol at 410. In response to identifying an operating parameters of the computing device associated with the communication protocol, the controller and/or the protocol application modify a mode of operation of the processor at 420. The method is then complete. In other embodiments, the method in FIG. 4 includes additional steps in addition to and/or in lieu of those depicted in FIG. 4.

Figure 5:
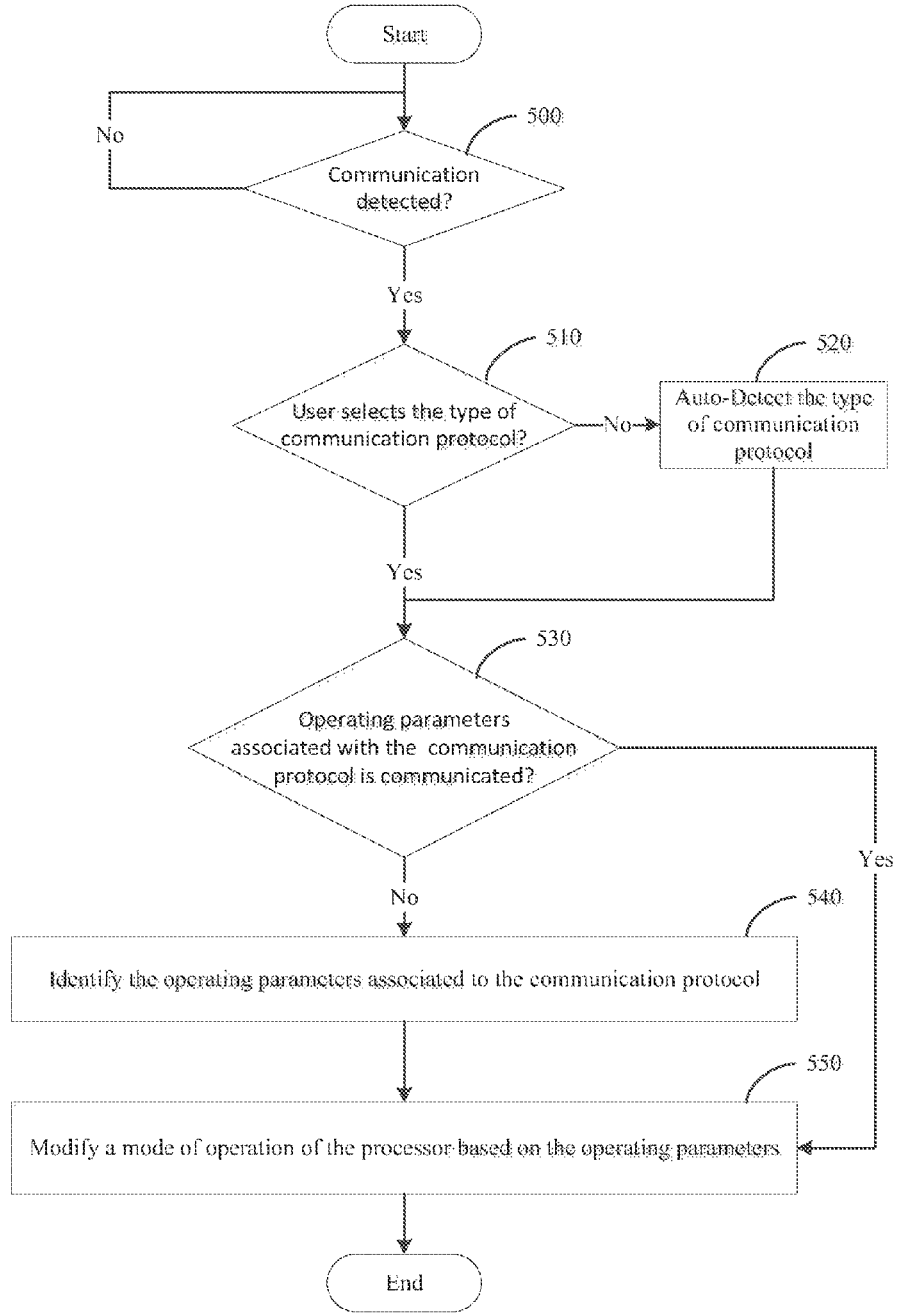
FIG. 5 is a flow chart illustrating a method to managing a computing device according to another example.

FIG. 5 is a flow chart illustrating a method to modify a computing device according to another example. The network interface component detects for a second computing device coupling to the computing device. If the computing device is coupled to the second computing device, the controller and/or the protocol application proceed to detect for communication between the computing device and the second computing device at 500. If no communication is detected, the controller and/or the protocol continue to detect for the communication at 500.

If communication is detected between the computing device and the second computing device, the controller and/or the protocol application proceed to detect the communication protocol. The controller and/or the protocol application can determine if a user has selected for a communication protocol to be used between the computing device and the second computing device at 510. If the user has selected a communication protocol, the controller and/or the protocol application use the selected communication protocol for the computing device to communicate with the second computing device. The controller and/or the protocol application proceed to identify operating parameters associated with the communication protocol.

If the user does not select a communication protocol, the controller and/or the protocol application automatically detect a communication protocol communicated from the second computing device at 520. Once the communication protocol has been detected, the controller and/or the protocol application proceed to identify operating parameters associated with the communication protocol. The operating parameters can identify which cores of the processor are used by the communication protocol and which cores of the processor are not used by the communication protocol. In one embodiment, the controller and/or the protocol application determine if the operating parameters are transmitted from the second computing device at 530. If the operating parameters associated with the communication protocol are transmitted to the computing device, the controller and/or the protocol application proceed to modify the mode of operation of the processor based on the operating parameters at 550. The controller and/or the protocol application can modify the mode of operation by enabling or disabling a core of the processor.

In another embodiment, the controller and/or the protocol application can modify the mode of operation by modifying an operating speed of a core of the processor. If the operating parameters associated with the communication protocol are not communicated to the computing device, the controller and/or the protocol application proceed to identify the operating parameters associated with the communication protocol at 540. As noted above, the controller and/or the protocol application can access a list, table, and/or database which include entries of communication protocols and their corresponding operating parameters.

In another embodiment, the controller and/or the protocol application access a history of the computing device to determine if the communication protocol was previously used. If the communication protocol was previously used, the controller and/or the protocol application can identify which cores of the processor were previously used by the communication protocol. Using the identified operating parameters, the controller and/or the protocol application modify the mode of operation of the processor at 550. The method is then complete. In other embodiments, the method in FIG. 5 includes additional steps in addition to and/or in lieu of those depicted in FIG. 5.

What is claimed is:

1. A computing device comprising:
    a memory;
    a processor coupled to the memory, wherein the processor is a central processing unit of the computing device;
    a network interface component, coupled to the processor, to establish a communication between the computing device and a second computing device; and
    a controller, coupled to the processor and the network interface component, to:
        in response to the established communication between the computing device and the second computing device, detect a communication protocol used for the established communication;
        identify, based on the detected communication protocol, one or more operating parameters of the processor, wherein the one or more operating parameters are associated with the communication protocol, wherein the one or more operating parameters include at least one selected from a group comprising a power supply level provided to at least one core of the processor, an operating speed of at least one core of the processor, and a level of access to a cache of the processor; and
        modify a mode of operation of the processor of the computing device based on the one or more operating parameters of the processor.

2. The computing device of claim 1 wherein the controller enables at least one core of the processor based on the one or more operating parameters of the processor.

3. The computing device of claim 1 wherein the controller disables at least one core of the processor based on the one or more operating parameters of the processor.

4. The computing device of claim 1 further comprising a stored data structure specifying that the one or more operating parameters of the processor are associated with the detected communication protocol.

5. The computing device of claim 4 wherein the stored data structure comprises a plurality of entries, wherein each entry of the plurality of entries specifies a particular protocol and at least operating parameter of the processor associated with the particular protocol.

6. A method for managing a computing device comprising:
    establishing a communication between the computing device and a second computing device using a network interface component of the computing device;
    in response to establishing the communication, detecting a communication protocol being used for the established communication between the computing device and the second computing device;
    identifying, based on the detected communication protocol, one or more operating parameters of a processor of the computing device, wherein the processor is a central processing unit of the computing device and is coupled to the network interface component, wherein the one or more operating parameters are associated with the communication protocol, wherein the one or more operating parameters include at least one selected from a group comprising a power supply level provided to at least one core of the processor, an operating speed of at least one core of the processor, and a level of access to a cache of the processor; and
    modifying a mode of operation of the processor of the computing device based on the one or more operating parameters of the processor.

7. The method for managing the computing device of claim 6 wherein the communication protocol is specified by a user.

8. The method for managing the computing device of claim 6 wherein the communication protocol is identified by a controller of the computing device.

9. The method for managing the computing device of claim 6 wherein modifying the operation mode of the processor includes disabling at least one core on the processor.

10. The method for managing the computing device of claim 6 wherein modifying the operation mode of the processor includes enabling at least one core on the processor.

11. The method for managing power usage of claim 6 wherein modifying the operation mode of the processor includes decreasing power to at least one core on the processor.

12. The method for managing power usage of claim 6 wherein modifying the operation mode of the processor includes increasing power to at least one core on the processor.

13. A non-transitory computer-readable medium comprising instructions that if executed by a controller will cause the controller to:
    establish a communication between a computing device and a second computing device using a network interface component of the computing device;
    in response to establishing the communication, detect a communication protocol being used for the established communication between the computing device and the second computing device;
    identify, based on the detected communication protocol, operating parameters of a processor of the computing device, wherein the processor is a central processing unit of the computing device, wherein the processor is coupled to the network interface component and to the controller, wherein the operating parameters are associated with the communication protocol, wherein the operating parameters include at least one selected from a group comprising a power supply level provided to at least one core of the processor, an operating speed of at least one core of the processor, and a level of access to a cache of the processor; and
    modify a mode of operation of the processor based on the operating parameters of the processor.

14. The computer-readable medium of claim 13 wherein the controller receives the operating parameters for the communication protocol from the second computing device.

15. The computer-readable medium of claim 13 wherein the processor comprises a plurality of cores, and wherein the controller identifies a particular core of the plurality of cores to modify based on the operating parameter.

16. The computer-readable medium of claim 15 wherein the processor comprises a plurality of cores, and wherein the controller increases an operating speed of at least one core of the plurality of cores based on the operating parameter.

17. The computer-readable medium of claim 15 wherein the processor comprises a plurality of cores, and wherein the controller decreases an operating speed of at least one core of the plurality of cores processor based on the operating parameter.

* * * * *

UNITED STATES PATENT AND TRADEMARK OFFICE
CERTIFICATE OF CORRECTION

| | |
|---|---|
| PATENT NO. | : 9,141,168 B2 |
| APPLICATION NO. | : 13/589065 |
| DATED | : September 22, 2015 |
| INVENTOR(S) | : Robert C. Brooks et al. |

It is certified that error appears in the above-identified patent and that said Letters Patent is hereby corrected as shown below:

In the Claims

In column 8, line 18 approx., in Claim 11, delete "power usage" and insert -- the computing device --, therefor.

In column 8, line 22 approx., in Claim 12, delete "power usage" and insert -- the computing device --, therefor.

Signed and Sealed this
Seventeenth Day of May, 2016

Michelle K. Lee
*Director of the United States Patent and Trademark Office*